United States Patent
Bombolowsky et al.

(10) Patent No.: US 10,061,475 B2
(45) Date of Patent: Aug. 28, 2018

(54) MULTI-TOUCH GESTURE FOR PRECISE SCROLLING THROUGH A LIST OF OBJECTS

(71) Applicants: Jens Bombolowsky, Heidelberg (DE); Thomas Angermayer, Stetten (DE); Wilko Dann, Ketsch (DE); Matthias Klauer, Weinheim (DE); Yulia Kosolapova, Bad Schoenborn (DE); Ralf Philipp, Altlussheim (DE); Carmen Riepp, Reilingen (DE); Bjoern Sanders, Schifterstadt (DE)

(72) Inventors: Jens Bombolowsky, Heidelberg (DE); Thomas Angermayer, Stetten (DE); Wilko Dann, Ketsch (DE); Matthias Klauer, Weinheim (DE); Yulia Kosolapova, Bad Schoenborn (DE); Ralf Philipp, Altlussheim (DE); Carmen Riepp, Reilingen (DE); Bjoern Sanders, Schifterstadt (DE)

(73) Assignee: SAP SE, Walldorf (DE)

( * ) Notice: Subject to any disclaimer, the term of this patent is extended or adjusted under 35 U.S.C. 154(b) by 914 days.

(21) Appl. No.: 14/512,169

(22) Filed: Oct. 10, 2014

(65) Prior Publication Data
US 2016/0103562 A1    Apr. 14, 2016

(51) Int. Cl.
*G06F 3/0482* (2013.01)
*G06F 3/0485* (2013.01)
*G06F 3/0488* (2013.01)
*G06F 3/0481* (2013.01)

(52) U.S. Cl.
CPC .......... *G06F 3/0482* (2013.01); *G06F 3/0481* (2013.01); *G06F 3/0485* (2013.01); *G06F 3/04883* (2013.01); *G06F 3/04886* (2013.01)

(58) Field of Classification Search
None
See application file for complete search history.

(56) References Cited

U.S. PATENT DOCUMENTS

| | | | |
|---|---|---|---|
| 6,448,987 B1 * | 9/2002 | Easty | G06F 3/0482 715/834 |
| 7,908,566 B2 * | 3/2011 | Wilcox | G06F 3/0485 715/712 |
| 8,402,391 B1 * | 3/2013 | Doray | G06F 3/0482 715/834 |
| 8,578,294 B2 * | 11/2013 | Eom | G06F 3/0482 715/769 |
| 2010/0083180 A1 * | 4/2010 | Matsubara | G06F 3/0481 715/834 |
| 2011/0047014 A1 * | 2/2011 | De Angelo | G06F 3/0482 705/14.4 |

(Continued)

*Primary Examiner* — Christopher J Fibbi
(74) *Attorney, Agent, or Firm* — Fountainhead Law Group P.C.

(57) ABSTRACT

Techniques are described for generating a graphical user interface for presenting a list of objects. The graphical user interface can include a selection zone encompassed by a partial outer ring that is configured to present a portion of the list of objects. Rotational touch gestures detected in the selection zone can cause the list of objects to scroll around the partial outer ring. The scroll rate of the objects can depend on the number of touch inputs detected as part of the touch gesture.

17 Claims, 8 Drawing Sheets

(56) References Cited

U.S. PATENT DOCUMENTS

2013/0104079 A1* 4/2013 Yasui .................... G06F 3/0482
                                                     715/834
2013/0219340 A1* 8/2013 Linge ................. G06F 3/04883
                                                     715/834
2014/0173529 A1* 6/2014 Hicks ................. G06F 3/04883
                                                     715/863

* cited by examiner

200a

List of Objects

| 6♦ | 2♠ | 3♦ | 5♣ | 1♥ | 4♣ | 7♠ | 8♥ | 9♦ |

Sorted List of Objects

| 5♣ | 4♣ | 3♦ | 6♦ | 9♦ | 1♥ | 8♥ | 7♠ | 2♠ |

Ordered List of Objects

| 1♥ | 2♠ | 3♦ | 4♣ | 5♣ | 6♦ | 7♠ | 8♥ | 9♦ |

FIG. 2C

MULTI-TOUCH GESTURE FOR PRECISE SCROLLING THROUGH A LIST OF OBJECTS

BACKGROUND

As technology advances, the dimensions of electronic components continue to decrease. As a result, the size of electronic devices created by the electronic components decrease in size to the point where a traditional keyboard or touchpad found on laptops and desktop computers are no longer a viable user interface for the electronic device. Due to these size constraints, a touch screen display has become the primary user interface for these small portable electronic devices.

The touch screen display presents content stored on the electronic device to a user. Given that electronic devices today are able to store large amounts of content, it can be difficult for the user to locate desired content on the electronic device. Scrolling through the available content can be time consuming and cumbersome.

SUMMARY

In one embodiment, a computer-implemented method provides, on a touch screen display, a graphical user interface in the form of a selection zone encompassed by a partial outer ring configured to display a portion of the list of objects. The method then receives, on the touch screen display, a touch gesture that includes at least one touch point. The method then revolves, on the touch screen display, the list of objects around the partial outer ring at a predefined scroll rate in response to the touch gesture, wherein the predefined scroll rate is dependent on a number of touch points received in the touch gesture.

In another embodiment, a non-transitory computer readable storage medium stores one or more programs comprising instructions for providing a graphical user interface in the form of a selection zone encompassed by a partial outer ring configured to display a portion of the list of objects, receiving a touch gesture that includes at least one touch point, and revolving the list of objects around the partial outer ring at a predefined scroll rate in response to the touch gesture, wherein the predefined scroll rate is dependent on a number of touch points received in the touch gesture.

In another embodiment, a computer implemented system comprises one or more computer processors and a non-transitory computer-readable storage medium. The non-transitory computer-readable storage medium comprises instructions, that when executed, control the one or more computer processors to be configured for providing a graphical user interface in the form of a selection zone encompassed by a partial outer ring configured to display a portion of the list of objects, receiving a touch gesture that includes at least one touch point, and revolving the list of objects around the partial outer ring at a predefined scroll rate in response to the touch gesture, wherein the predefined scroll rate is dependent on a number of touch points received in the touch gesture.

The following detailed description and accompanying drawings provide a better understanding of the nature and advantages of the present disclosure.

BRIEF DESCRIPTION OF THE DRAWINGS

FIG. 2A illustrates an exemplary list of objects according to one embodiment;

FIG. 2B illustrates an exemplary sorted list of objects according to one embodiment;

FIG. 2C illustrates an exemplary ordered list of objects according to one embodiment;

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Disclosed herein are techniques for precisely scrolling through a list of objects by interpreting a touch gesture. The touch gesture can be a swipe gesture or a rotational touch gesture. The scroll rate in which the list of objects are scrolled through a touch screen display is dependent on the number of touch points in the touch gesture. For example, a touch gesture having one touch point may be assigned a fast scroll rate for quickly browsing through the list while a touch gesture having two touch points may be assigned a slow scroll rate for precise browsing through a few objects within the list. In one embodiment, the graphical user interface can include a partial outer ring used to display the list of objects. At any given point in time, a portion of the list of objects can be displayed on the partial outer ring. As a touch gesture is detected to scroll through the list of objects, objects from the list of objects can appear on the partial outer ring while other objects from the list of objects can disappear from the partial outer ring. In some embodiments, objects can appear from a first end of the partial outer ring and disappear from a second end of the partial outer ring. Exemplary objects can be calendar days, ticket sales, a collection of items (such as food items, or inventory items for a business), and a catalog of items.

Figure 1:
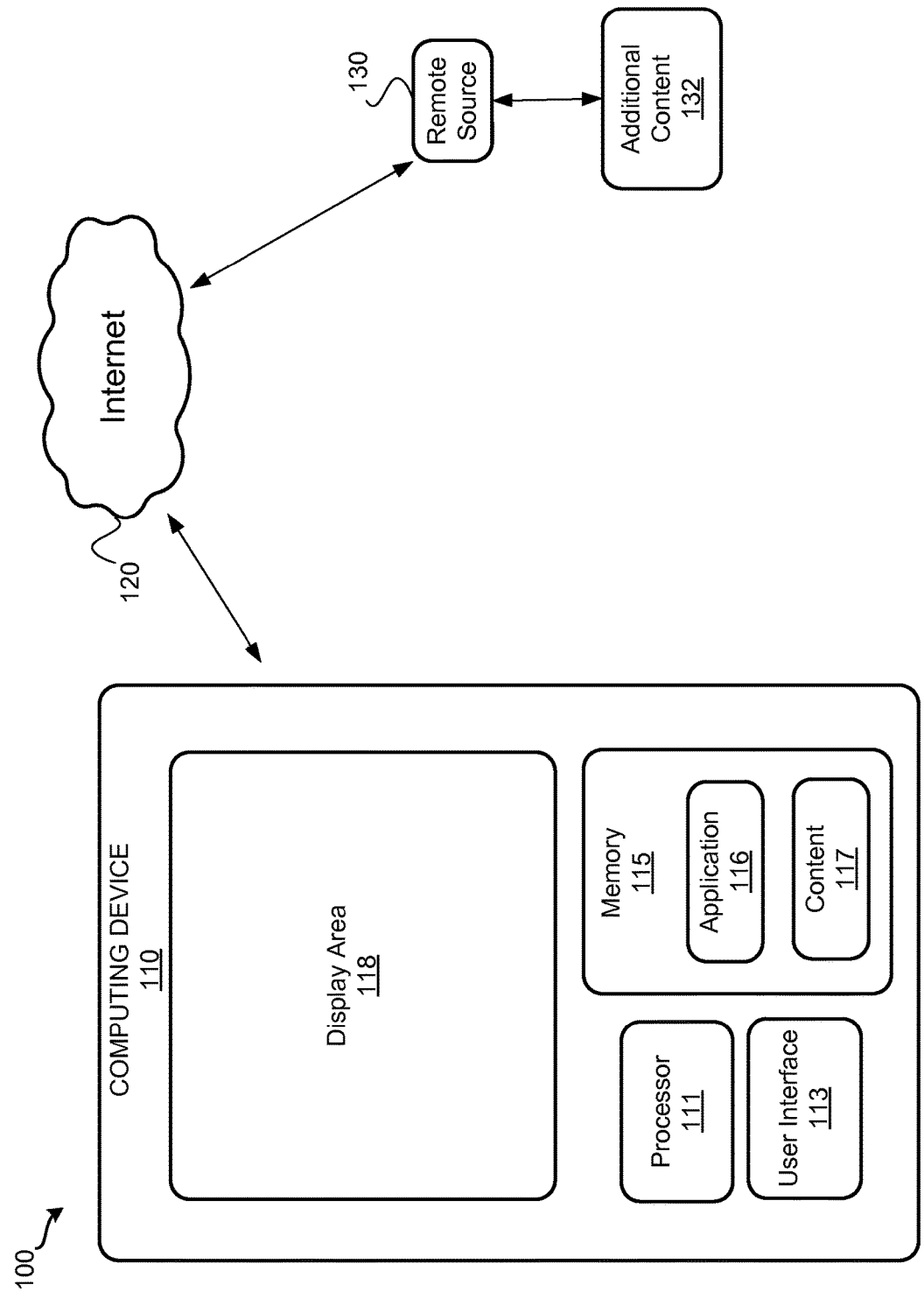
FIG. 1 illustrates an exemplary high level system diagram according to one embodiment.

FIG. 1 illustrates an exemplary high level system diagram according to one embodiment. System 100 includes computing device 110. Computing device 110 can be a portable electronic device or any other computing device that includes a touch interface. Computing device 110 includes processor 111, user interface 113, memory 115, and display area 118. Processor 111 can be configured to execute application module 116 stored in memory 115. As the application is being executed, display area 118 can provide an output interface for the application while user interface 113 can provide an input interface for the application. In some examples, the user interface can include a touchpad, a keyboard, a microphone, or a camera. In other examples, a touch sensitive display can replace display area 118, thus serving as both a display area and a touch interface.

Memory 115 also stores content module 117. Content module 117 includes a list of objects that can be processed by processor 111 for presentation on display area 118. Alternatively, processor 111 can process objects from additional content module 132 for presentation on display area 118. Processor 111 can communicate with remote source 130 through internet 120 to retrieve the objects from additional content module 132. In some examples, the list of objects being presented on display area 118 can be a combination of a first list of objects in content module 117 and a second list of objects from additional content module 132. The list of objects can be sorted, ordered or both sorted and ordered. The difference between these types of lists are described in FIGS. 2A, 2B, and 2C which illustrate examples of list of objects according to one embodiment. FIG. 2A illustrates an exemplary list of objects according to one embodiment. As shown, list 200a includes objects which are playing cards. List 200a includes nine playing cards of varying suits.

FIG. 2B illustrates an exemplary sorted list of objects according to one embodiment. A sorted list of objects can contain objects which are sorted into groups or categories. As shown, sorted list 200b includes the objects from list 200a but in a sorted order. Sorted list 200b has been sorted according to suit, where clubs appear first, diamonds appear second, hearts appear third, and spades appear fourth. The first club playing card in list 200a is the five of clubs. As a result, the five of clubs appears first in sorted list 200b. The second club playing card in list 200a is the four of clubs. As a result, the four of clubs appears second in sorted list 200b. This process continues with the diamond, heart, and spade suit, resulting in sorted list 200b. As shown, the playing cards in sorted list 200b are sorted but not ordered. For example, the seven of spades appears before the two of spades (decreasing order) while the one of hearts appears in front of the eight of hearts (increasing order). Thus, there is no consistent ordering among the objects in the list. An example of a sorted list of objects is a catalog of foods where nuts are grouped together, meats are grouped together, and fruits are grouped together. Thus, the catalog includes objects which are sorted into categories including nuts, meats, and fruits.

FIG. 2C illustrates an exemplary ordered list of objects according to one embodiment. An ordered list of objects can contain objects which are ordered with respect to one another. As shown, ordered list 200c includes the objects from list 200a but in increasing order. The lowest number playing card in list 200a is the one of hearts. As a result, the one of hearts appears first in ordered list 200c. Similarly, the second lowest number playing card in list 200b is the two of spades. As a result, the two of spades appears second in ordered list 200c. This process can continue until ordered list 200c is generated. In some embodiments, the list of objects can be sorted, then ordered. For example, sorted list 200b can be subsequently ordered. Ordering the sorted list can include ordering the playing cards in each suit. For instance, four of clubs can be ordered in front of five of clubs, thus causing the two playing cards to change positions. An example of an ordered list of objects is an email database where the emails (e.g., objects) are ordered according to date. In some embodiments, an automated process can intake a list of objects and create an ordered list of objects, a sorted list of objects, a sorted then ordered list of objects, or an ordered then sorted list of objects. An example of a sorted and ordered list of objects is a calendar database where the calendar days are sorted into months and the calendar days within each month are ordered.

Returning to FIG. 1, application 116 running on processor 111 can present a graphical user interface on display area 118. The graphical user interface can be configured to display a list of objects. Given that the list of objects can contain more objects than can be displayed within the graphical user interface, the graphical user interface can be configured to display a portion of the list of objects at a time and allow the user to scroll through the list of objects. As the user scrolls through the list of objects, the graphical user interface can update the portion of the list of objects that is being displayed in display area 118. As described above, the list of objects can optionally be ordered, sorted, or both ordered and sorted. The graphical user interface can display a portion of the list of objects within various shapes configured to display the list of objects. For example, a portion of the list of objects can be displayed in a straight line in display area 118. As another example, the portion of the list of objects can be displayed along the perimeter of a circle, a square, a diamond, or other shape. When a touch gesture representative of a scroll request is received, processor 111 can generate a touch event. The touch event can cause processor 111 to scroll the list of objects, thereby updating the portion of the list of objects that is being displayed in display area 118. In one embodiment, the scroll rate of the list of objects can be dependent on the number of touch points that are received in the touch event. For example, a touch gesture that includes one touch point can be interpreted as a request for fast scrolling. As a result, the list of objects can be quickly scrolled through the graphical user interface. As another example, a touch gesture that includes two touch points can be interpreted as a request for slow scrolling. As a result, the list of objects can be slowly scrolled through the graphical user interface, thus providing the user an opportunity to examine the objects as they are being scrolled through the graphical user interface.

Figure 3:
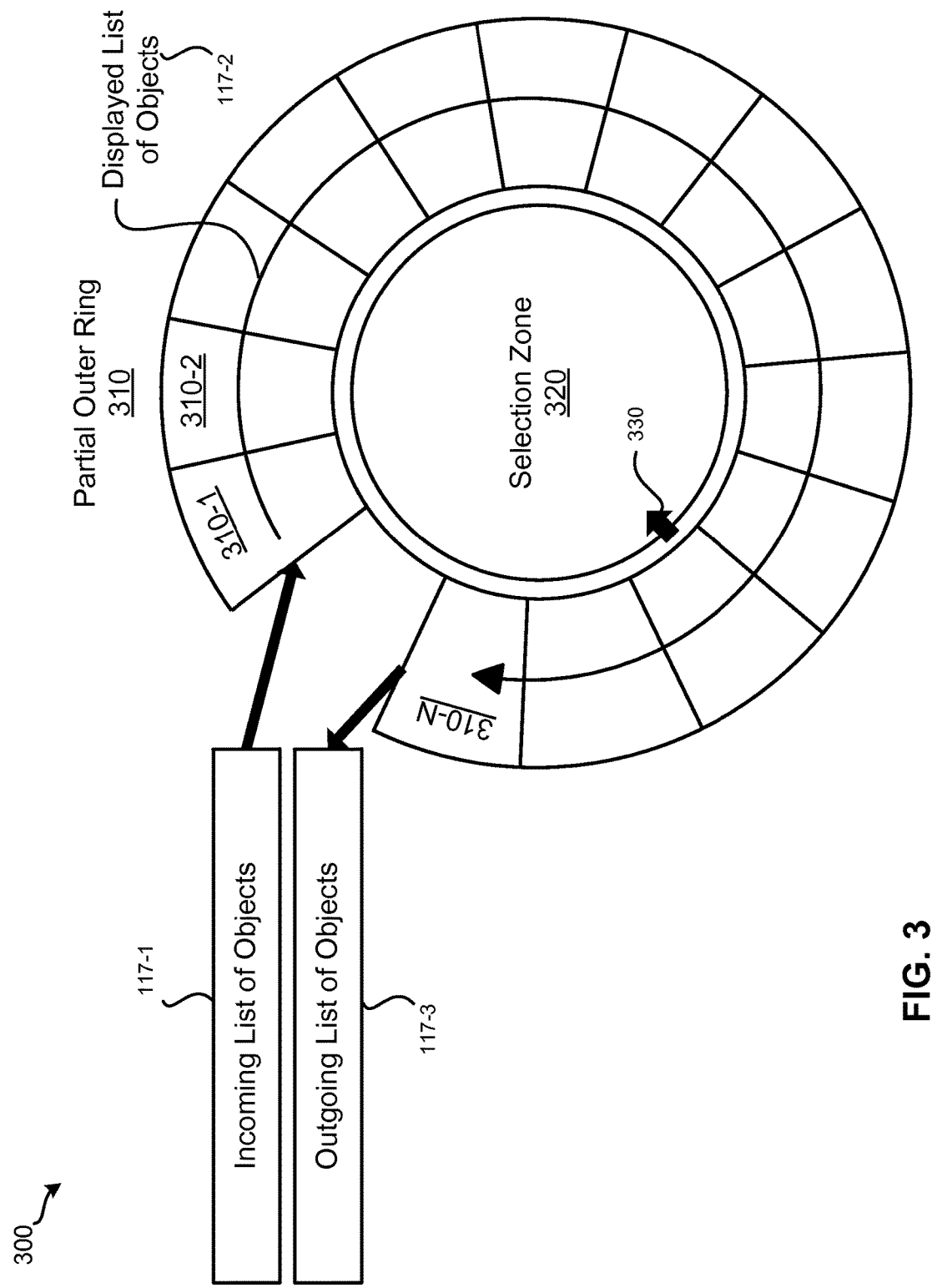
FIG. 3 illustrates a graphical user interface according to one embodiment

FIG. 3 illustrates a graphical user interface according to one embodiment. As shown here, graphical user interface 300 includes partial outer ring 310 and selection zone 320. Partial outer ring 310 is made of multiple segments (310-1, 320-2, to 310-N). Each segment can display an object from list of objects 117. Objects from list of objects 117 that have yet to be displayed in partial outer ring 310 are identified as incoming list of objects 117-1, objects from list of objects 117 that are being displayed in partial outer ring 310 are identified as displayed list of objects 117-2, and objects from list of objects 117 that have previously been displayed in partial outer ring 310 are identified as outgoing list of objects 117-3. Incoming list of objects 117-1 and outgoing list of objects 117-3 are shown in graphical user interface 300 here for illustrative purposes but are not displayed to the user on graphical user interface 300. In other examples however, incoming list of objects 117-1 and outgoing list of objects 117-3 can be included in graphical user interface 300. For example, an icon can be presented to show the current state of incoming list of objects 117-1. The icon can represent how many objects that are currently within incoming list of objects 117-1. This can be useful to inform the user how many objects remain in incoming list of objects 117-1 without having to display all the objects within incoming list of objects 117-1. A similar icon can be used to show the current state of outgoing list of objects 117-3.

Here, a portion of list of objects 117 (displayed list of objects 117-2) is being displayed in the segments of partial outer ring 310. When a scroll request to scroll forward is detected, processor 111 can update graphical user interface 300 by rotating the displayed list of objects 117-2 clockwise. Rotating the displayed list of objects 117-2 can result in three changes to partial outer ring 310. The first change is that the displayed list of objects 117-2 can be rotated clockwise to a neighboring segment. For example, the object displayed in segment 310-1 can be moved to segment 310-2. Rotating the displayed list of objects 117-2 causes segment 310-1 being empty. As a result, the second change is that a next object in incoming list of objects 117-1 can enter partial outer ring 310 in segment 310-1. The next object in incoming list of objects 117-1 can be an object that is neighboring the object that was previously being displayed in segment 310-1, which now has been rotated clockwise to segment 310-2. Due to rotating the displayed list of objects 117-2 clockwise, the object displayed in 310-N may exit partial outer ring. Thus, the third change is that the object displayed in segment 310-N can exit partial outer ring 310 and enter outgoing list of objects 117-3. In one example, outgoing list of objects 117-3 can be a last-in-first-out array. Thus, the last object that enters outgoing list of objects 117-3 can be the first object that enters back into partial outer ring 310 at 310-N when the list of objects are scrolled counter-clockwise.

When a scroll request to scroll backward is detected, processor 111 can update graphical user interface 300 by rotating the displayed list of objects 117-2 counterclockwise. Rotating the displayed list of objects counterclockwise can result in three changes to partial outer ring 310; an object from outgoing list of objects 117-3 can enter partial outer ring 310, the displayed list of objects 117-2 can rotate counterclockwise by one segment, and the object displayed in segment 310-1 can exit partial outer ring 310 and into incoming list of objects 117-1. In some embodiments, objects can be animated as they enter and exit partial outer ring 310. For example, objects can fade into graphical user interface 300 as they enter partial outer ring 310 from incoming list of objects 117-1 and can fade out of graphical user interface 300 as they exit partial outer ring 310 into outgoing list of objects 117-3.

Graphical user interface 300 can detect the scroll request through various touch events. In one embodiment, a touch event can be detected on partial outer ring 310. For example, a rotational clockwise touch gesture performed on partial outer ring 310 can be processed as a clockwise scroll request while a rotational counterclockwise touch gesture performed on partial outer ring 310 can be processed as a counter-clockwise scroll request. In another embodiment, a touch event can be detected within selection zone 320. Selection zone 320 is an area that is encompassed by partial outer ring 310. The encompassed area can be circular in shape. A touch gesture (e.g., rotational clockwise or counterclockwise touch gesture) that is performed within selection zone 320 can be processed to scroll through list of objects 117. In some examples, indicator 330 can identify the position of displayed list of objects 117-2 relative to ordered list of objects 117.

Figure 4A:
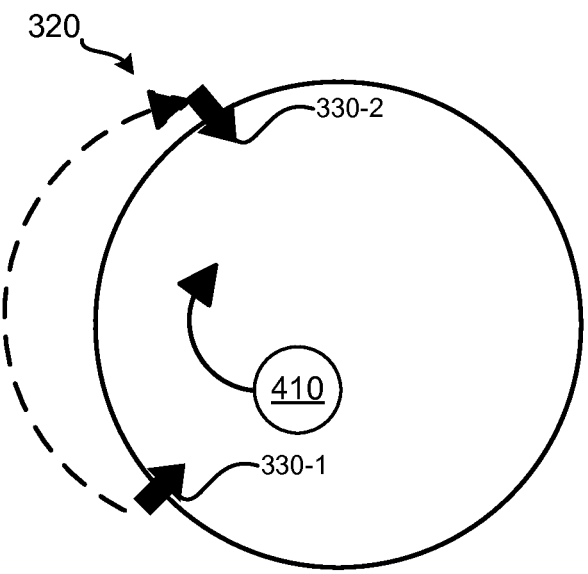
FIG. 4A illustrates an example of a single touch point touch gesture according to one embodiment.
Figure 4B:
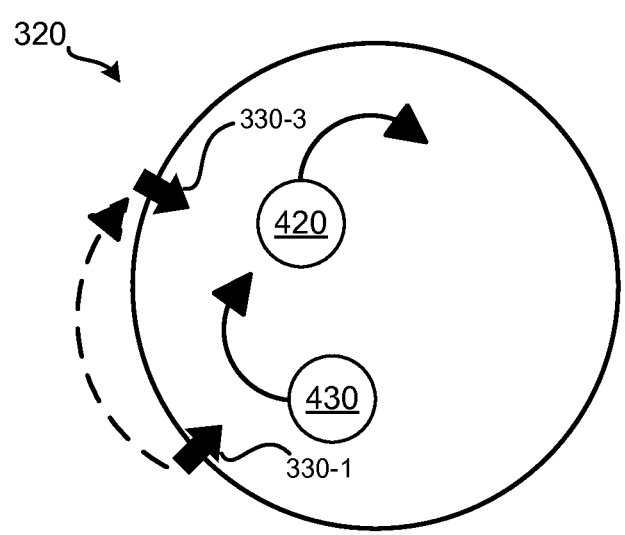
FIG. 4B illustrates an example of a two touch point touch gesture according to one embodiment.

In some embodiments, processor 111 can be configured to process touch gestures having one or more touch points. In one embodiment, processor 111 can set the scroll rate for a scroll request based on the number of touch points in the touch gesture. For example, the scroll rate can be set to a higher rate when the touch gesture includes a single touch point (e.g., one finger touch gesture) and can be set to a slower rate when the touch gesture includes a two touch points (e.g., two finger touch gesture). FIG. 4A illustrates an example of a single touch point touch gesture according to one embodiment. Here, the touch gesture comprises touch point 410 rotated clockwise by an angle. Processor 111 can process the touch gesture as a request to scroll forward (e.g., clockwise) by a number of objects that is dependent on the angle of rotation. The number of objects to scroll forward can then be multiplied by a multiplier which is based on the number of touch points. In one example, the multiplier can be 5 when there is a single touch point, 3 when there is two touch points, and 1 when there are more than two touch points. In other examples, other values can be set as the multipliers for the number of touch points. Depending on the multipliers, having more touch points can result in faster or lower scrolling. For instance if the multipliers were 1 for one touch point, 2 for two touch points, and 3 for three touch points (and so on), then using more touch points can result in faster scrolling. Alternatively if the multipliers were 5 for one touch point, 4 for two touch points, 3 for three touch points, (and so on), then using more touch points can result in slower, more precise scrolling). Here, the single touch point in combination with the angle of rotation can result in the scrolling of a number of objects from list of objects 117 that results in indicator 330-1 moving to new position 330-2. FIG. 4B illustrates an example of a two touch point touch gesture according to one embodiment. Here, touch points 420 and 430 are rotated by approximately the same angle of rotation as touch point 410 in FIG. 4A. However, due to an increase in the number of touch points, a smaller multiplier is used thus resulting in a slower scrolling rate. This is illustrated by indicator 330-1 moving to new position 330-3. New position 330-3 shows that the touch event consisting of two touch points in FIG. 4B has scrolled less than the touch event consisting of a single touch point in FIG. 4A even though the angle of rotation is approximately the same.

Figure 5:
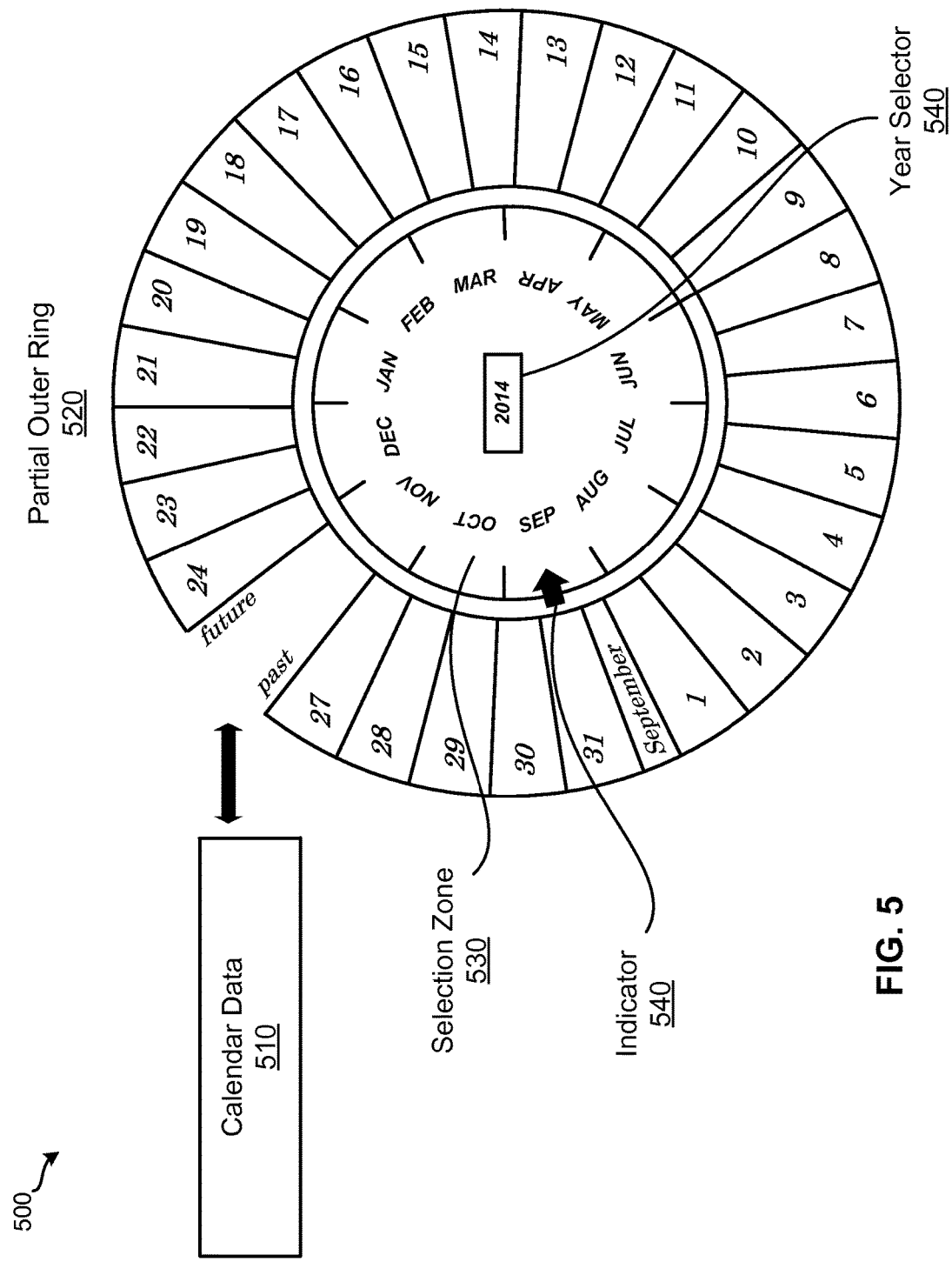
FIG. 5 illustrates another graphical user interface according to one embodiment.

FIG. 5 illustrates another graphical user interface according to one embodiment. Here, graphical user interface 500 is configured to display calendar data 510 along partial outer ring 520. As shown, the calendar dates between Aug. 27, 2014 and Sep. 24, 2014 are being displayed simultaneously in partial outer ring 520. Processor 111 can process scroll requests detected in selection zone 530 (or detected elsewhere in graphical user interface 500) to scroll through calendar data 510. During forward scrolling, the calendar dates can rotate clockwise along partial outer ring 520, where some calendar dates enter partial outer ring 520 from one end and some other calendar dates exit partial outer ring 520 from another end. At the end of forward scrolling, the calendar dates simultaneously displayed in partial outer ring 520 have been updated with a different date range. In some examples, the calendar dates can be animated along partial outer ring 520 as calendar dates are scrolled. Partial outer ring 520 can also include text towards the end titled "future" and "past." The end titled "future" can be the end of partial outer ring 520 where future dates enter and exit partial outer ring 520. Similarly, the end titled "past" can be the end of partial outer ring 520 where past dates enter and exit partial outer ring 520.

Graphical user interface 500 further includes selection zone 530. Selection zone 530 can be configured to detect touch gestures. The touch gestures can cause calendar data 510 to scroll along partial outer ring 520. Selection zone 530 can further include indicator 540. Indicator 540 can be configures to rotate around the perimeter of selection zone 530 in response to detected touch gestures to indicate portion of calendar data 510 that is being displayed around partial outer ring 520. To help identify the portion being displayed, selection zone 530 can include a plurality of markers. Here, the markers are months of the year (January, February, March, April, May, June, July, August, September, October, November, and December). When indicator 540 is pointing to a given month, that month is currently being displayed along partial outer ring 520. For instance, partial outer ring is currently displaying the majority of the month of September. As a result, indicator 540 is pointing to the marker titled "SEP." Depending on the scroll rate, the calendar dates can scroll around partial outer ring 520 at a faster or slower pace. At the same time, indictor 540 can rotate around the perimeter of selection zone 530 at a faster or slower pace. In some embodiments, selection zone 530 can also include year selector 540. Year selector 540 can be positioned in the center of selection zone 530 and be configured to detect a touch gesture. The touch gesture can be a swipe gesture across year selector 540. Upon detecting the swipe gesture, processor 111 can update the year within calendar data 510 that is being displayed along partial outer ring 520. In one example, a single swipe gesture can increment or decrement the year by one. If year selector 540 is included as a part of selection zone 530, then the center portion of selection zone 530 can be configured to receive touch gestures for year selector 540. The center portion can be encompassed by an outer portion of selection zone 530 that is configured to receive touch gestures for scrolling through calendar data 510.

Figure 6:
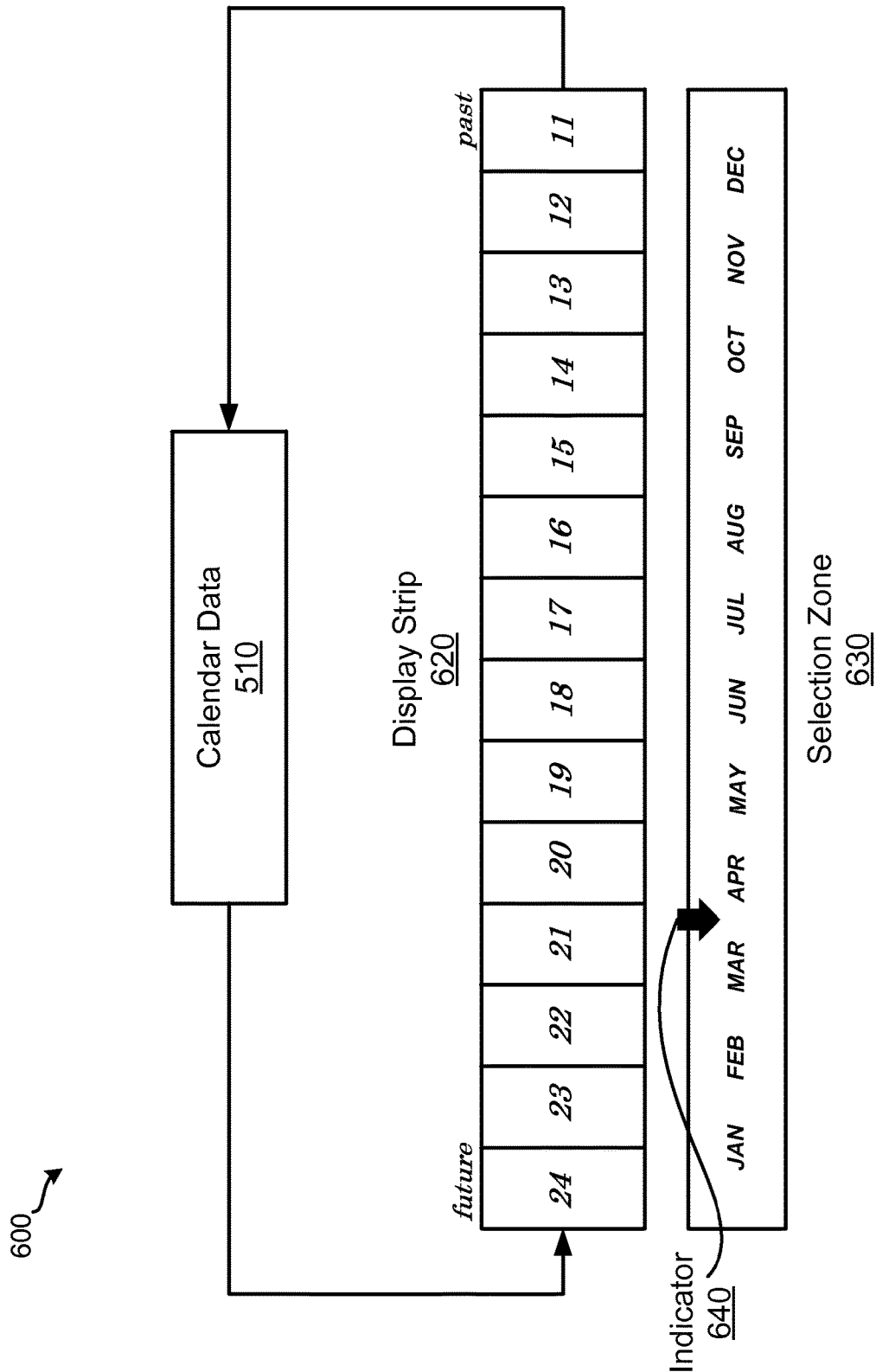
FIG. 6 illustrates another graphical user interface according to one embodiment.

FIG. 6 illustrates another graphical user interface according to one embodiment. Here, graphical user interface 600 is configured to display calendar data 510 across display strip 620. Display strip 620 includes a multiple segments that each are configured to display a calendar date. As a request is received to scroll through calendar dates, processor 111 can scroll the calendar dates across display strip 620. In one embodiment, scrolling to the future can cause the calendar dates to move to the right, where future calendar dates enter on the left end of display strip 620 and past calendar dates exit to the right end of display strip 620. In some embodiments, the request can be received as a touch gesture in graphical user interface 600.

Graphical user interface 600 further includes selection zone 630. Selection zone 630 can be configured to receive touch gestures. In one example, the touch gesture can be swipe gestures. Processor 111 can process detected touch gestures to scroll calendar dates across display strip 620. In one embodiment, processor 111 can scroll calendar dates to the future (e.g., to the right) when it detects a swipe gesture to the right. Similarly, processor 111 can scroll calendar dates to the past (e.g., to the left) when it detects a swipe gesture to the left. Selection zone 630 can further include indicator 640. Indicator 640 can identify the position of the portion of calendar data 510 that is currently being displayed in display strip 620 relative to the remainder of calendar data 510. For example if calendar data 510 includes calendar dates for a single year, then indicator 640 can be positioned along the top edge of selection zone 630 relative to the portion of calendar data 510 that is being displayed in display strip 620. Here, indicator 640 is positioned between markers "MAR" and "APR," thus indicating that the calendar dates being displayed in display strip 620 are days within March. When a touch gesture is detected within selection zone 630, processor 111 can scroll through calendar data 510 accordingly. In some embodiments, the scroll rate can be adjusted based on the number of touch points in the touch gesture. For example, a swipe gesture with a single finger can have a faster scroll rate than a swipe gesture with two fingers. Similarly, a swipe gesture with two fingers can have a faster scroll rate than a swipe gesture with three fingers.

Figure 7:
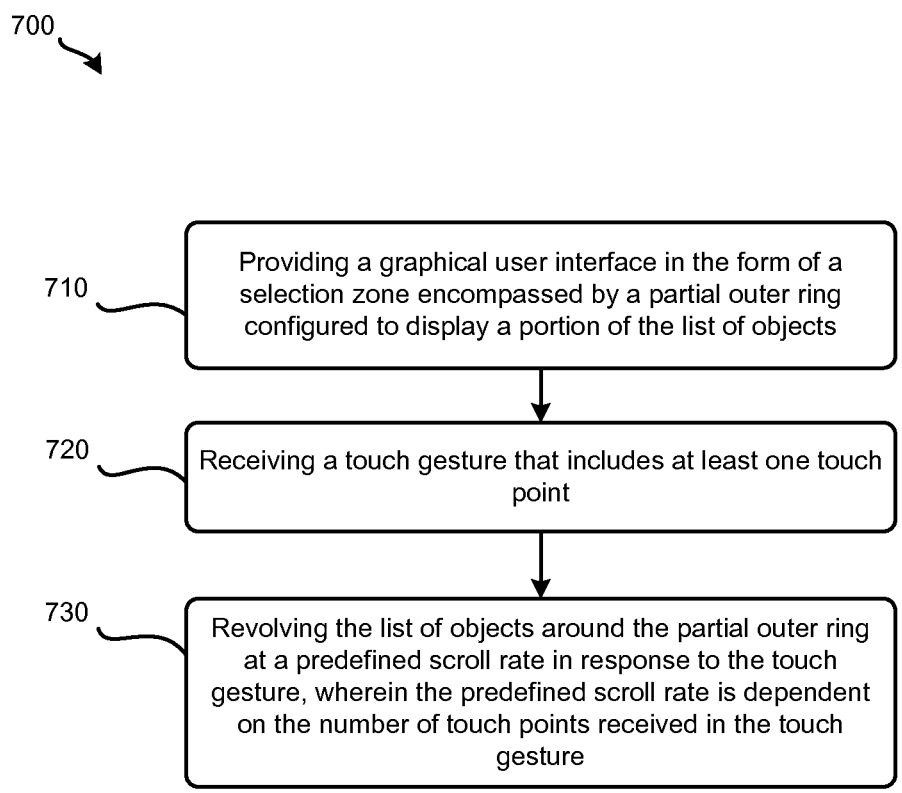
FIG. 7 illustrates a process for scrolling through a list of objects according to one embodiment.

FIG. 7 illustrates a process for scrolling through a list of objects according to one embodiment. Process 700 can be stored in computer readable code and executed by a processor. For example, process 700 can be part of the computer readable code that is stored within application 116 and is executed by processor 111 of FIG. 1. Process 700 can begin by providing a graphical user interface in the form of a selection zone encompassed by a partial outer ring configured to display a portion of the list of objects at 710. The selection zone can be configured to receive the touch gesture. In some embodiments, the touch gesture can be a rotational touch gesture having one or more touch points. In one example, the number of touch points can depend on the number of fingers used to generate the touch gesture. The selection zone can include an indicator configured to rotate around the perimeter of the selection zone in response to the rotational touch gesture. The indicator can identify the position of the portion of the list being displayed on the partial outer ring relative to the list of objects.

Once the graphical user interface is provided, process 700 can continue by receiving a touch gesture that includes at least one touch point at 720. Process 700 then continues by revolving the list of objects around the partial outer ring at a predefined scroll rate in response to the touch gesture. The predefined scroll rate can be dependent on the number of touch points received in the touch gesture. For example, a first scroll rate can be applied when there is a single touch point and a second scroll rate can be applied when there are two or more touch points. The partial outer ring can be configured to present a predefined number of objects at one time. When the list of objects are revolved around the partial outer ring, an object can be introduced into the partial outer ring while another object is being removed from the partial outer ring (to make room for the introduced object). The objects displayed in the partial outer ring can be selectable. Depending on implementation details, additional processing can be performed on the selected one or more objects. In one example, a rotational swipe gesture across one or more of the displayed objects can result in the processor selecting the one or more displayed objects which have been swiped. In some examples, the list of objects can be a sorted list of objects that represent calendar days and the selection zone can include a plurality of markers that represent calendar months. An indicator can rotate around the perimeter of the selection zone. The indicator can identify the calendar dates being displayed on the partial outer ring based on the position of the indicator relative to the markers. For example if the indicator is close to a marker that correspond to the month June, then calendar days within June are currently being displayed on the partial outer ring.

Figure 8:
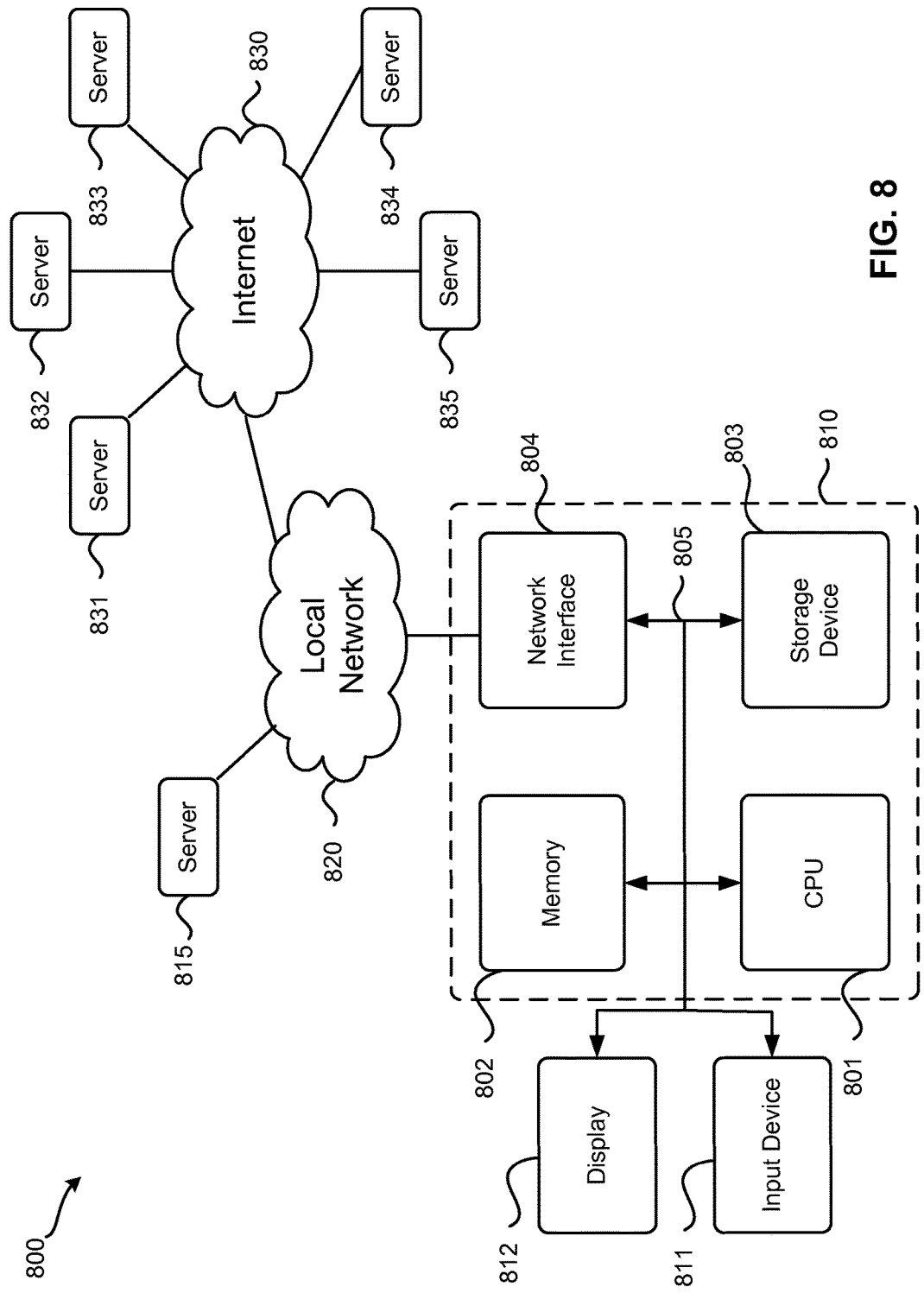
FIG. 8 illustrates an exemplary computer system according to one embodiment.

An exemplary computer system 800 is illustrated in FIG. 8. Computer system 810 includes a bus 805 or other communication mechanism for communicating information, and a processor 801 coupled with bus 805 for processing information. Computer system 810 also includes a memory 802 coupled to bus 805 for storing information and instructions to be executed by processor 801, including information and instructions for performing the techniques described above, for example. This memory may also be used for storing variables or other intermediate information during execution of instructions to be executed by processor 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 803 may include source code, binary code, or software files for performing the techniques above, for example. Storage device and memory are both examples of computer readable mediums.

Computer system 810 may be coupled via bus 805 to a display 812, such as a cathode ray tube (CRT) or liquid crystal display (LCD), for displaying information to a computer user. An input device 811 such as a keyboard and/or mouse is coupled to bus 805 for communicating information and command selections from the user to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 804 sends and receives electrical, electromagnetic, or optical signals that carry digital data streams representing various types of information.

Computer system 810 can send and receive information, including messages or other interface actions, through the network interface 804 across a local network 820, an Intranet, or the Internet 830. For a local network, computer system 810 may communicate with a plurality of other computer machines, such as server 815. Accordingly, computer system 810 and server computer systems represented by server 815 may form a cloud computing network, which may be programmed with processes described herein. In the Internet example, software components or services may reside on multiple different computer systems 810 or servers 831-835 across the network. The processes described above may be implemented on one or more servers, for example. A server 831 may transmit actions or messages from one component, through Internet 830, local network 820, and network interface 804 to a component on computer system 810. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method for scrolling through a list of objects, comprising:
    providing, on a touch screen display, a graphical user interface comprising a circle encompassed by a partial outer ring configured to display a portion of the list of objects, the circle comprising an interior selection zone comprising a plurality of markers, the markers corresponding to different portions of the list of objects, and the graphical user interface further comprising a preview area, positioned proximate to the opening of the partial outer ring, identifying a subset of incoming and outgoing objects from the list of objects that are not currently displayed in the partial outer ring;
    receiving, on the touch screen display, a rotational touch gesture that includes at least one touch point; and
    revolving, on the touch screen display, the list of objects around the partial outer ring at a predefined scroll rate in response to the rotational touch gesture, wherein the circle includes an indicator configured to rotate around the circle in response to the touch gesture, the indicator positioned proximate to the markers to identify the portion of the list of objects being displayed on the partial outer ring relative to the list of objects, wherein the objects enter and exit the partial outer ring at the predefined scroll rate from the preview area during the rotational touch gesture.

2. The computer-implemented method of claim 1, wherein the selection zone is configured to receive the touch gesture.

3. The computer-implemented method of claim 1, wherein the identification of objects from the list of objects that are not displayed in the partial outer ring comprises a first icon representing how many objects are currently within an incoming list of objects and a second icon representing how many objects are currently within an outgoing list of objects.

4. The computer-implemented method of claim 3, wherein the list of objects is a sorted list of objects that represent calendar days and the circle includes a plurality of markers that represent calendar months, wherein a plurality of days that correspond to a calendar month are displayed on the partial outer ring when the indicator is positioned near a marker corresponding to the calendar month.

5. The computer-implemented method of claim 1, wherein the partial outer ring is configured to present a predefined number of objects and revolving the list of objects updates the portion of the list of objects that is displayed in the partial outer ring.

6. The computer-implemented method of claim 1, wherein objects displayed in the partial outer ring are selectable.

7. A non-transitory computer readable storage medium storing one or more programs, the one or more programs comprising instructions for:
    providing a graphical user interface comprising a circle encompassed by a partial outer ring configured to display a portion of a list of objects, the circle comprising an interior selection zone comprising a plurality of markers, the markers corresponding to different portions of the list of objects, and the graphical user interface further comprising a preview area, positioned proximate to the opening of the partial outer ring, identifying a subset of incoming and outgoing objects from the list of objects that are not currently displayed in the partial outer ring;
    receiving a rotational touch gesture that includes at least one touch point; and
    revolving the list of objects around the partial outer ring at a predefined scroll rate in response to the rotational touch gesture, wherein the circle includes an indicator configured to rotate around the circle in response to the touch gesture, the indicator positioned proximate to the markers to identify the portion of the list of objects being displayed on the partial outer ring relative to the list of objects, wherein the objects enter and exit the partial outer ring at the predefined scroll rate from the preview area during the rotational touch gesture.

8. The non-transitory computer readable storage medium of claim 7, wherein the selection zone is configured to receive the touch gesture.

9. The non-transitory computer readable storage medium of claim 7, wherein the identification of objects from the list of objects that are not displayed in the partial outer ring comprises a first icon representing how many objects are currently within an incoming list of objects and a second icon representing how many objects are currently within an outgoing list of objects.

10. The non-transitory computer readable storage medium of claim 9, wherein the list of objects is a sorted list of objects that represent calendar days and the circle includes a plurality of markers that represent calendar months, wherein a plurality of days that correspond to a calendar month are displayed on the partial outer ring when the indicator is positioned near a marker corresponding to the calendar month.

11. The non-transitory computer readable storage medium of claim 7, wherein the partial outer ring is configured to present a predefined number of objects and revolving the list of objects updates the portion of the list of objects that is displayed in the partial outer ring.

12. The non-transitory computer readable storage medium of claim 7, wherein objects displayed in the partial outer ring are selectable.

13. A computer implemented system, comprising:
one or more computer processors; and
a non-transitory computer-readable storage medium comprising instructions, that when executed, control the one or more computer processors to be configured for:
providing a graphical user interface comprising a circle encompassed by a partial outer ring configured to display a portion of list of objects, the circle comprising an interior selection zone comprising a plurality of markers, the markers corresponding to different portions of the list of objects, and the graphical user interface further comprising a preview area, positioned proximate to the opening of the partial outer ring, identifying a subset of incoming and outgoing objects from the list of objects that are not currently displayed in the partial outer ring;
receiving a rotational touch gesture that includes at least one touch point; and
revolving the list of objects around the partial outer ring at a predefined scroll rate in response to the rotational touch gesture, wherein the circle includes an indicator configured to rotate around the circle in response to the touch gesture, the indicator positioned proximate to the markers to identify the portion of the list of objects being displayed on the partial outer ring relative to the list of objects, wherein the objects enter and exit the partial outer ring at the predefined scroll rate from the preview area during the rotation touch gesture.

14. The computer implemented system of claim 13, wherein the selection zone is configured to receive the touch gesture.

15. The computer implemented system of claim 13, wherein the identification of objects from the list of objects that are not displayed in the partial outer ring comprises a first icon representing how many objects are currently within an incoming list of objects and a second icon representing how many objects are currently within an outgoing list of objects.

16. The computer implemented system of claim 15, wherein the list of objects is a sorted list of objects that represent calendar days and the circle includes a plurality of markers that represent calendar months, wherein a plurality of days that correspond to a calendar month are displayed on the partial outer ring when the indicator is positioned near a marker corresponding to the calendar month.

17. The computer implemented system of claim 13, wherein the partial outer ring is configured to present a predefined number of objects and revolving the list of objects updates the portion of the list of objects that is displayed in the partial outer ring.

* * * * *